United States Patent
Mook et al.

(10) Patent No.: US 10,150,255 B2
(45) Date of Patent: Dec. 11, 2018

(54) DIRECT METAL ELECTROPHOTOGRAPHY ADDITIVE MANUFACTURING METHODS

(71) Applicant: General Electric Company, Schenectady, NY (US)

(72) Inventors: Joshua Tyler Mook, Loveland, OH (US); William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/956,896

(22) Filed: Dec. 2, 2015

(65) Prior Publication Data
US 2017/0157849 A1  Jun. 8, 2017

(51) Int. Cl.
| | |
|---|---|
| *B29C 64/141* | (2017.01) |
| *B29C 67/00* | (2017.01) |
| *B33Y 10/00* | (2015.01) |
| *G03G 15/22* | (2006.01) |
| *B29C 64/153* | (2017.01) |

(Continued)

(52) U.S. Cl.
CPC ........ *B29C 67/0077* (2013.01); *B22F 3/1055* (2013.01); *B29C 64/153* (2017.08); *B33Y 10/00* (2014.12); *G03G 15/224* (2013.01); *G03G 15/225* (2013.01); *B22F 2003/1054* (2013.01); *B22F 2003/1056* (2013.01); *B29C 64/141* (2017.08); *B33Y 70/00* (2014.12); *Y02P 10/295* (2015.11)

(58) Field of Classification Search
CPC ....... G03G 13/04; G03G 13/045; G03G 13/06
See application file for complete search history.

(56) References Cited

U.S. PATENT DOCUMENTS

| | | | |
|---|---|---|---|
| 4,444,858 A | * | 4/1984 | Nishibu .............. G03G 13/283 101/465 |
| 6,066,285 A | | 5/2000 | Kumar |

(Continued)

FOREIGN PATENT DOCUMENTS

| | | |
|---|---|---|
| JP | H10-207194 A | 8/1998 |
| JP | H10-265804 A | 10/1998 |

(Continued)

OTHER PUBLICATIONS

European Search Report and Opinion issued in connection with related EP Application No. 16201014.4 dated Apr. 5, 2017.

(Continued)

*Primary Examiner* — Peter L Vajda
(74) *Attorney, Agent, or Firm* — General Electric Company; Brian Overbeck (57) ABSTRACT

Methods for printing a three-dimensional part are provided. The method can include charging an outer surface of a rotating photoreceptor drum with an electrostatic charge; neutralizing the electrostatic charge on a portion of the outer surface of the rotating photoreceptor drum surface to form a layer definition corresponding to the neutralized portion; transferring a plurality of charged metal powder particles onto the outer surface of the rotating photoreceptor drum corresponding to the neutralized portion; and transferring the charged metal powder particles from the outer surface of the rotating photoreceptor drum onto a workpart to form a metal print layer.

17 Claims, 3 Drawing Sheets

(51) Int. Cl.
*B22F 3/105* (2006.01)
*B33Y 70/00* (2015.01)

(56) References Cited

U.S. PATENT DOCUMENTS

| | | | |
|---|---|---|---|
| 8,879,957 | B2 | 11/2014 | Hanson et al. |
| 9,029,058 | B2 | 5/2015 | Martin |
| 9,134,685 | B1 | 9/2015 | Katakura |
| 9,566,647 | B1 | 2/2017 | Mook et al. |
| 2006/0188800 | A1* | 8/2006 | Magome .............. G03G 9/0819 430/106.1 |
| 2013/0252160 | A1* | 9/2013 | Nagayama ......... G03G 9/08755 430/108.2 |
| 2013/0272746 | A1 | 10/2013 | Hanson et al. |
| 2015/0016841 | A1 | 1/2015 | Hanson et al. |
| 2015/0024169 | A1 | 1/2015 | Martin |
| 2015/0024309 | A1 | 1/2015 | Martin |
| 2015/0024316 | A1 | 1/2015 | Orrock et al. |
| 2015/0024317 | A1 | 1/2015 | Orrock et al. |
| 2015/0024319 | A1 | 1/2015 | Martin |
| 2015/0100149 | A1 | 4/2015 | Coeck et al. |
| 2015/0273582 | A1 | 10/2015 | Crump et al. |
| 2016/0339542 | A1* | 11/2016 | Paetz ................. B29C 67/0055 |

FOREIGN PATENT DOCUMENTS

| | | | | |
|---|---|---|---|---|
| JP | H10-307455 | A | 11/1998 | |
| JP | H11-070586 | A | 3/1999 | |
| JP | 2002-347129 | A | 12/2002 | |
| JP | 2003-268465 | A | 9/2003 | |
| JP | 2009-054832 | A | 3/2009 | |
| WO | 2007073205 | A1 | 6/2007 | |
| WO | WO 2007/073205 | * | 6/2007 | .............. B22F 3/105 |
| WO | 2012127456 | A1 | 9/2012 | |
| WO | WO2015/009790 | A1 | 1/2015 | |
| WO | 2015091826 | A1 | 6/2015 | |
| WO | WO 2015/091826 | * | 7/2015 | .............. G03G 15/22 |

OTHER PUBLICATIONS

European Search Report and Opinion issued in connection with corresponding EP Application No. 16201015.1 dated Apr. 12, 2017.
Notification of Reasons for Refusal issued in connection with corresponding JP Application No. 2016-230734 dated Sep. 19, 2017.

* cited by examiner

DIRECT METAL ELECTROPHOTOGRAPHY ADDITIVE MANUFACTURING METHODS

FIELD OF THE INVENTION

The present subject matter relates generally to additive manufacturing systems and methods for building three-dimensional (3D) parts. In particular, the present disclosure relates to systems and processes for building 3D parts with direct metal electrophotography-based systems (DME) and/or ionography-based systems using metallic build materials.

BACKGROUND OF THE INVENTION

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, direct metal laser melting (DMLM), and stereolithographic processes. For each of these techniques, the digital representation of the 3D part is initially sliced into multiple horizontal (X-Y) layers. For each sliced layer, a tool path is then generated, which provides instructions for the particular additive manufacturing system to form the given layer.

Current powder bed DMLM machines are fraught with limitations, especially those preventing large-size scalable systems, the limitations including but not limited to speed, powder volume, trapped powder, and thermal stresses. Speed limitations include recoating and laser scan times that are too slow. Current processes are essentially 1-D (point melting) repeated in X-Y space and then repeated in Z space. Typical layers require 300 seconds of laser time followed by 10 seconds of recoat time. Powder volume limitations exist because every nook and cranny of the build cube must be filled with powder requiring large volumes of powder charges which must be dealt with during and after build. For large area builds, this powder charge could be thousands of pounds. Also, trapped powder limitations occur because closed volumes are impossible to build as the powder cannot be evacuated. The current requirement to evacuate powder also limits design freedom. And, current DMLM machines impose large thermal stresses on parts resulting from rapid build material solidification thereby creating geometrical distortions and sometimes cracking in the parent material. In addition, the entire platform must be stress relieved prior to cut-off which is difficult for large parts due to the heavy loads and size limitations of commonly accessible furnaces.

In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

However, a need exists for improved printing techniques for 3D printing, particularly with metal build materials.

BRIEF DESCRIPTION OF THE INVENTION

Aspects and advantages of the invention will be set forth in part in the following description, or may be obvious from the description, or may be learned through practice of the invention.

Methods are generally provided for printing a three-dimensional part. In one embodiment, the method includes charging an outer surface of a rotating photoreceptor drum with an electrostatic charge; neutralizing the electrostatic charge on a portion of the outer surface of the rotating photoreceptor drum surface to form a layer definition corresponding to the neutralized portion; transferring a plurality of charged metal powder particles onto the outer surface of the rotating photoreceptor drum corresponding to the neutralized portion; and transferring the charged metal powder particles from the outer surface of the rotating photoreceptor drum onto a workpart to form a metal print layer.

Additionally or alternatively, the method for printing a three-dimensional part can include positioning a metal workpart on a stationary platform; electrically charging the platform; preheating the metal workpart; rolling a rotating photoreceptor drum across the preheated metal workpart to transfer a plurality of charged metal powder particles from an outer surface of the rotating photoreceptor drum onto an outer surface of the workpart to form a metal print layer; and fusing the metal print layer to the workpart.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Figure 1:
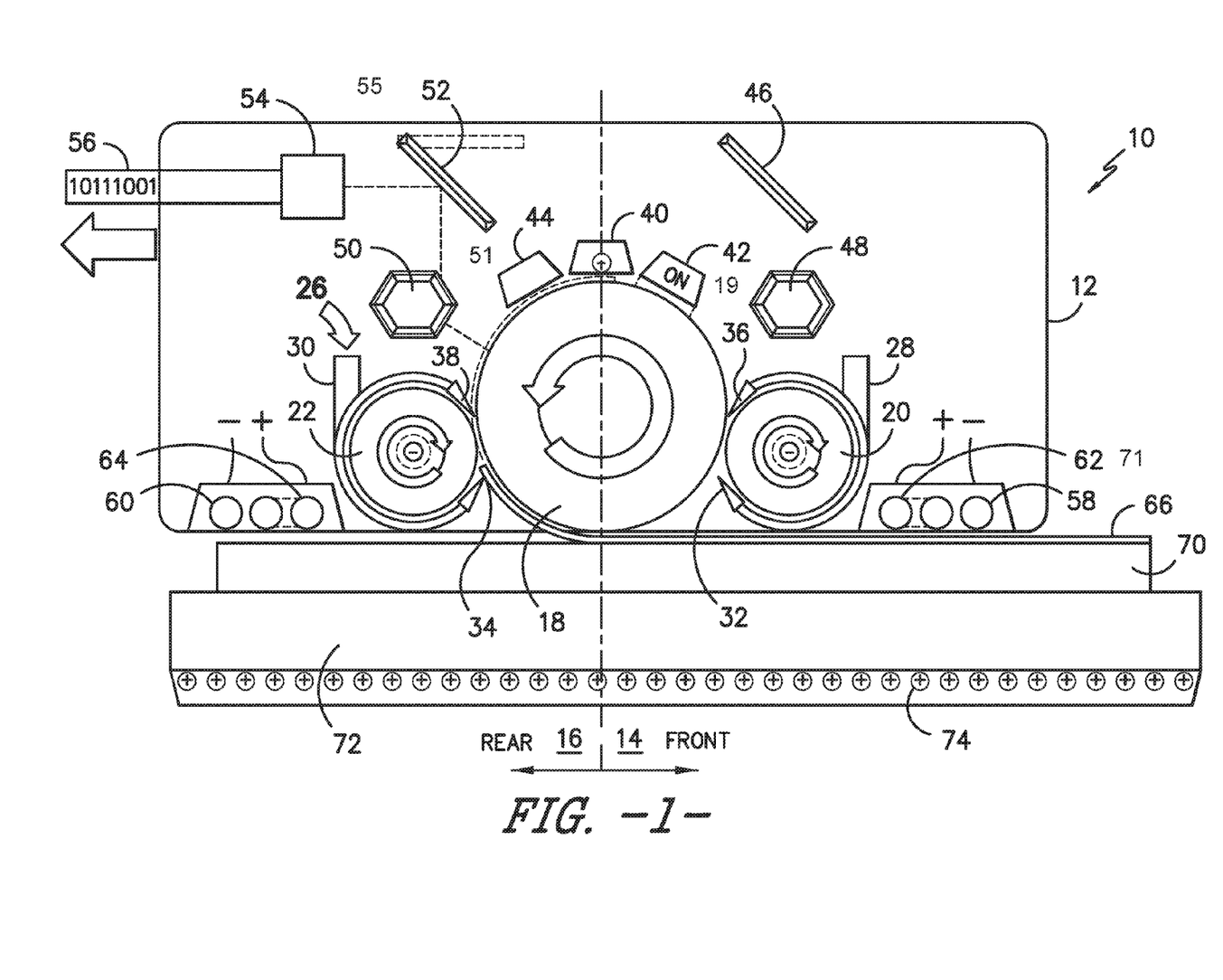
FIG. 1 is a schematic of a mirrored DME 3D printer as it moves in the rearward direction.
Figure 2:
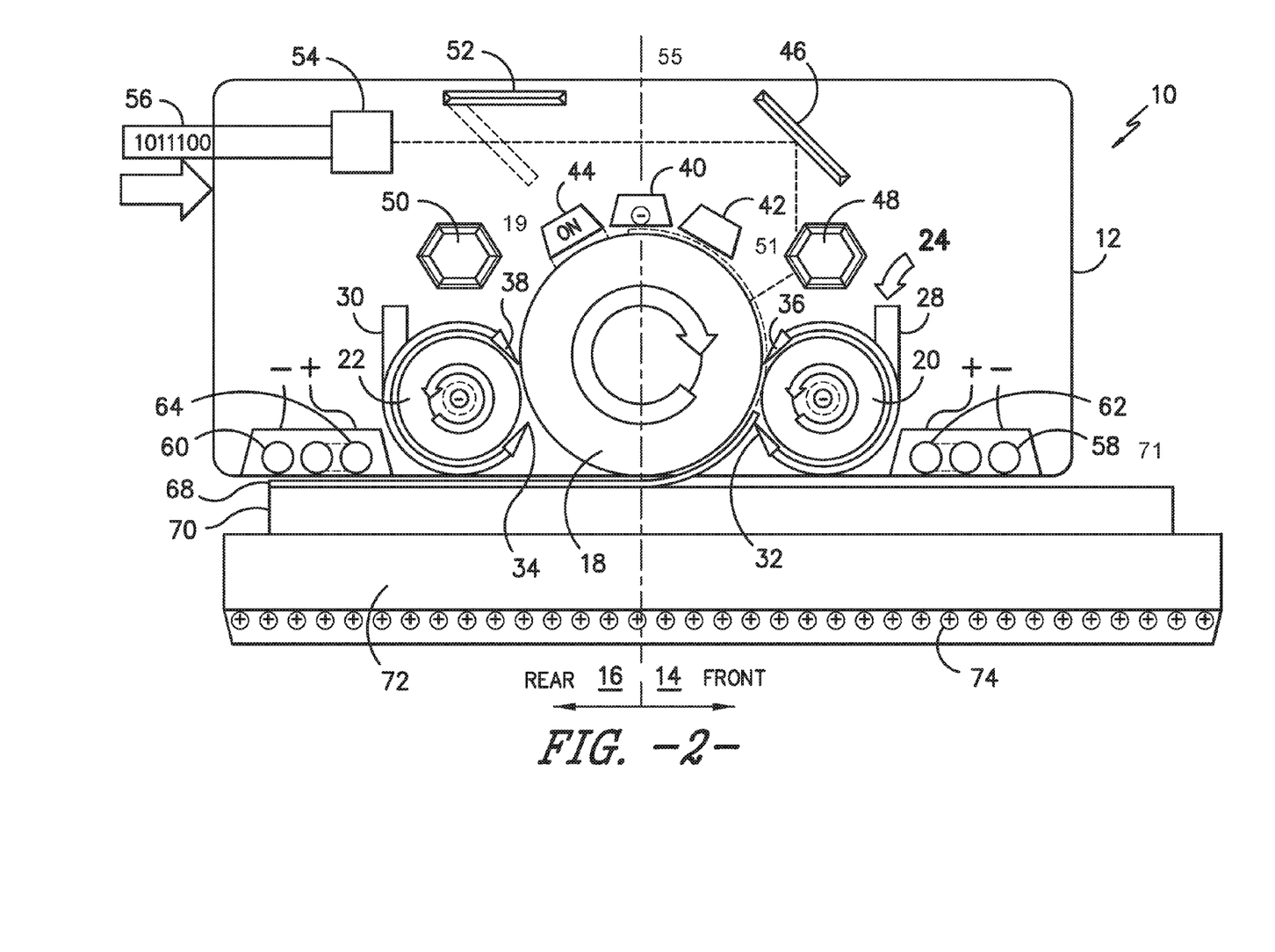
FIG. 2 is a schematic of a mirrored DME 3D printer as it moves in the frontward direction.

Referring to the drawings, FIGS. 1 and 2 show an exemplary embodiment of an additive manufacturing system 10, depicted as cross-section of a direct metal electrophotography machine (DME), for printing a three-dimensional part having a mobile housing 12 defining a front housing section 14 and rear housing section 16.

The exemplary additive manufacturing system 10 of FIGS. 1 and 2 includes a photoreceptor drum 18, having a drum outer surface 19, positioned within a mobile housing 12. Although the photoreceptor drum 18 is shown as being centrally disposed within the mobile housing 12, any suitable configuration can be utilized in accordance with the present description.

The mobile housing 12 is positioned adjacent to a workpart 70, such that the drum outer surface 19 of the photoreceptor drum 18 is facing the printable surface 71 of the workpart 70. Generally, the workpart 70 is constructed from an electrically conducting material, such as a metal, so as to allow electrical biasing thereof. For example, the workpart 70 can be constructed of a metal alloy, including superalloys of aluminum, iron, nickel, titanium, cobalt, chromium or mixtures thereof.

A charging electrode 40 is positioned to apply electrostatic charge to the outer surface 19 of the photoreceptor drum 18 during an additive manufacturing process. Although shown as being centrally located within the housing 12 on the opposite side of the photoreceptor drum 18 from the workpart 70, the charging electrode 40 can be positioned in any suitable location within the housing 12 in accordance with the present disclosure. Generally, the charging electrode 40 projects an electrostatic charge onto the outer surface 19 of the photoreceptor drum 18 and/or any other revolving photosensitive drums or belts which are capable of holding an electrostatic charge on its surface. Thus, during printing, the outer surface 19 of the photoreceptor drum 18 is electrostatically charged after rotating by the charging electrode 40. Generally, the charging electrode 40 has a length that is at least as long as the length of the photoreceptor drum 18 so as to charge the entire outer surface 19 of the photoreceptor drum 18. In one embodiment, the charging electrode 40 is a corona wire positioned parallel to the axis of the photoreceptor drum 18 to project an electrostatic charge thereon. It is noted that this process can be operated in the absence of light (i.e., without any lighting within the housing 12).

An AC bias is also applied to the photoreceptor drum 18 to remove any residual charges left by previous layers. The photoreceptor drum 18 also has a DC bias, applied from the charging electrode 40, on the drum surface 19 to ensure a uniform negative potential thereon.

The photoreceptor drum outer surface 19 can have a silicon coating with the photoconductive layer having three layers including, from the outermost inward, a Charge Transport Layer (CTL), Charge Generation Layer (CGL), and barrier or oxidizing layer formed on the underlying aluminum substrate. The CTL is a clear layer approximately 20 microns thick, which allows light to pass through to the CGL and controls charge acceptance to the photoreceptor drum outer surface 19. The CGL is about 0.1 to 1 micron thick and allows the flow of ions. The barrier layer bonds the photoconductive layer to the aluminum substrate.

A laterally stationary platform 72 is disposed outside the mobile housing 12 adjacent the workpart 70, and can have at least one charged transfer electrode 74 in electrical communication with the laterally stationary platform 72. The photoreceptor drum 18 passes near the workpart 70, which is positively charged by transfer electrodes 74 on the back side of the platform 72, to pull the powder particles from the photoreceptor drum 18 to the workpart 70 and form a print layer 66, 68 according to the pattern on the outer surface 19.

A controller circuit 56 performs multiple operations for the exemplary embodiment. The controller circuit 56 can provide motion commands for traversing the mobile housing 12 about the workpart 70 to position the DME 10 in accordance with a data stream from a print file (e.g., from a user's computer and/or other controller). The controller circuit 56 can also selectively reflect at least one laser diode 54 emission onto the photoreceptor drum 18 to expose a layer definition portion 51 of the outer surface 19 while the photoreceptor drum 18 rotates in opposing front and rear rotational directions. The laser diode(s) 54 can be directed to rotating polygonal scanning mirrors 48, 50, that direct the laser beam 55 through a system of lenses and mirrors onto the photoreceptor drum 18. The photoreceptor drum 18 continues to rotate during the sweep and the angle of sweep compensates for this motion. A stream of model data from the controller circuit 56 turns the laser on and off to selectively irradiate the photoreceptor drum 18 surface 19 in those areas that do not correspond with the build layer cross section. Interaction of the laser 55 radiation with the photo reactive surface 19 enables local photoconductivity of the drum and permits surface static discharge of the areas where transfer of powder to the build layer is not desired. This process retains static charge of the drum surface 19 in those areas corresponding to the build cross section so that it may be subsequently used to lift and transfer powder to the drum surface 19 for application onto the workpart 70 as a build layer 68.

Figure 3:
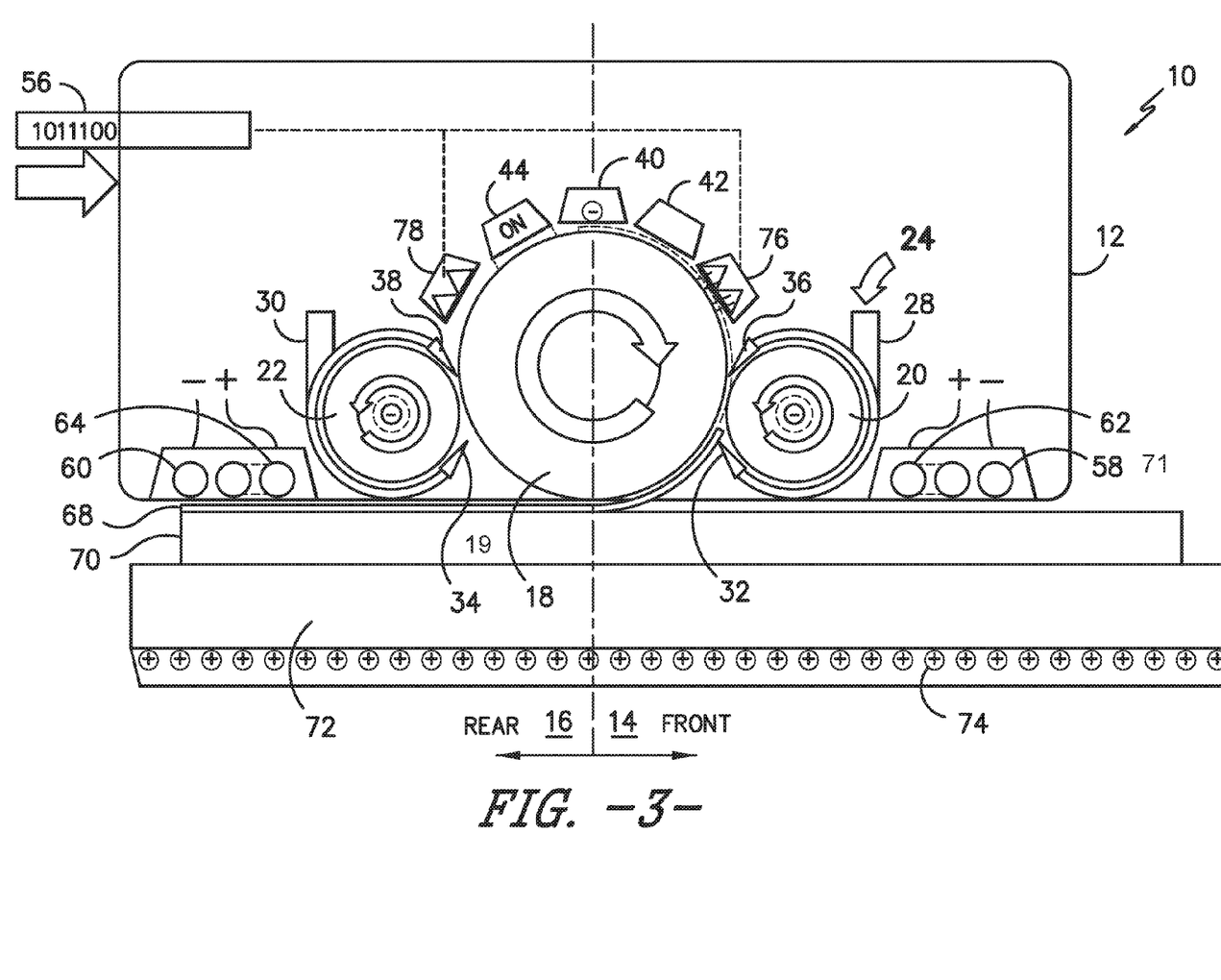
FIG. 3 is a schematic of an LED array DME 3D printer using light emitting diode arrays.

As shown in FIG. 3, exposure can also be performed using a front light emitting diode (LED) array 76 and rear light emitting diode (LED) array 78 spanning the width of the photoreceptor drum 18, each array being controlled by the controller circuit 56.

The controller circuit 56 also simultaneously rotates a front charged powder roller 20 and a rear charged powder roller 22 in counter rotational directions, respectively synchronized with and counter to the front and rear rotational directions of the photoreceptor drum 18, thereby presenting a developed portion of charged powder onto the layer definition of the photoreceptor drum 18 and subsequently transferring the developed portion onto the workpart 70 as respective metal print layers 66, 68. The photoreceptor drum outer surface 19 with the layer definition is exposed to powder particles from the front and rear powder feed 28, 30 depending on the rotational direction of the photoreceptor drum 18. The powder particles are given a negative charge, and are electrostatically attracted to the photoreceptor drum layer definition, i.e. the areas touched by the laser. Because like charges repel, the negatively charged powder will not attach to the drum where the negative charge remains. The front and rear powder rollers 20, 22 can also apply a DC bias on the photoreceptor drum outer surface 19 to ensure a uniform negative potential.

The front and rear powder cartridges 28, 30 can include metal materials, such as superalloys of aluminum, iron, nickel, titanium, cobalt, chromium or mixtures thereof, for formation and depositing of metal print layers 66, 68 of the same composition.

The controller circuit 56 also can control fusing operations of front and rear microwave emitters 58, 60 disposed inside the mobile housing 12, for fusing the respective metal print layers 66, 68 to the workpart 70. Additionally, the controller circuit 56 can control operation of front and rear induction coils 62, 64 disposed inside the mobile housing, for heating the workpart using thermal radiation, though any suitable heat supply can be utilized. During forward direction motion (see FIG. 2) of the mobile housing 12, front microwave emitters 58 and/or front induction coils 62 pre-heat the workpart 70 to prepare the surface for transferring the developed layer definition and acts to reduce the propensity of cracking and thermal distortion while rear microwave emitters 60 and/or rear induction coils 64 sinter the current developed layer definition to bind to the workpart 70. During rearward direction motion (see FIG. 1) of the mobile housing 12, the front and rear fusing operations of the microwave emitters and induction coils are reversed. The front and rear microwave emitters 58, 60 can operate at frequencies of about 100 MHz to about 300 GHz, or any frequency suitable for coupling with the powder and/or workpart 70. That is, the microwave emitters 58, 60 can emit electromagnetic radiation having a wavelength of about 100 MHz to about 300 GHz.

The controller circuit 56 may include suitable computer-readable instructions that, when implemented, configure the controller circuit 56 to perform various different functions, such as receiving, transmitting and/or executing control signals using computer logic.

A computer generally includes a processor(s) and a memory. The processor(s) can be any known processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory can also include data that may be retrieved, manipulated, or stored by processor(s). For instance, after receiving the DME 10 layer definition, memory can store the information. Additionally, memory can store parameters for various other sources.

The computing device can include a network interface for accessing information over a network. The network can include a combination of networks, such as Wi-Fi network, LAN, WAN, the Internet, cellular network, and/or other suitable network and can include any number of wired or wireless communication links. For instance, the computing device could communicate through a wired or wireless network with the DME 10.

A cleaning operation of the DME 10 additive manufacturing system can include front and rear powder skimmers 36, 38 disposed adjacent the front and rear charged powder rollers 20, 22 for cleaning excess powder from the photoreceptor drum 18. The front and rear powder skimmers 36, 38 can also include front and rear adjustable layer cutting blades 32, 34. When the layer is complete, the electrically neutral adjustable layer cutting blades 32, 34 clean any excess powder from the photoreceptor drum 18 and deposits the powder back into the respective powder cartridge 28, 30. For printing subsequent layers, the laterally stationary platform 72 drops by the layer thickness blade setting on the adjustable layer cutting blades 32, 34 and the mobile print head housing 12 begins to traverse in the opposite direction for the next layer. This operation repeats until the workpart is complete.

Additional structures in the DME 10 front housing section 14 can include at least one fixed mirror 46 and at least one front scanning mirror 48 for reflection of the laser beam, and at least one front discharge lamp 42 for discharging the photoreceptor drum outer surface 19. Additional structures in the DME 10 rear housing section 16 can include at least one side selector mirror 52 and at least one rear scanning mirror 50 for reflection of the laser beam, and at least one rear discharge lamp 44 for discharging the photoreceptor drum outer surface 19.

The DME 10 additive manufacturing system is sizeable to any length without affecting functionality and multiple print heads can installed in a single mobile housing 12. Multiple mobile housings 12 can be used to build the same part on a single workpart 70.

The DME 10 additive manufacturing system deposits directly onto the workpart only the quantity and layers of build material required to build the part, with minimal waste. That is, after printing utilizing the DME 10 additive manufacturing system, there is little-to-no excess powder to remove from the printed surface and very little post processing of the part.

The DME 10 additive manufacturing system also reduces and/or eliminates thermal stresses through the process via layerwise heating, and prints in two dimensions (2-D linear fusing). Thus, there is no need for thermal cycles to relieve stress in the workpart following printing using the DME 10 additive manufacturing system.

In one embodiment, a method for printing a three-dimensional part involves charging an outer surface of a rotating photoreceptor drum with an electrostatic charge; neutralizing the electrostatic charge on a portion of the outer surface of the rotating photoreceptor drum surface to form a layer definition corresponding to the neutralized portion; then transferring a plurality of charged metal powder particles onto the outer surface of the rotating photoreceptor drum corresponding to the neutralized portion; and transferring the charged metal powder particles from the outer surface of the rotating photoreceptor drum onto a workpart to form a metal print layer. The method can use a metal workpart positioned on an electrically charged, stationary platform wherein the rotating photoreceptor drum rolls over the workpart to transfer the charged metal powder particles from the outer surface of the rotating photoreceptor drum onto the workpart. Additionally, the method can involve fusing the metal print layer to the workpart using electromagnetic radiation having wavelengths of about 100 MHz to about 300 GHz. The printing method can also preheat the workpart, using thermal radiation for example, prior to transferring the charged metal powder particles from the outer surface of the rotating photoreceptor drum onto the workpart.

In one embodiment, the printing method can neutralize the electrostatic charge by exposing the rotating photoreceptor drum outer surface to a layer definition using at least one laser beam. The layer definition can be provided by a controller circuit. The charged metal powder particles can then be delivered from at least one charged powder roller onto the outer surface of the photoreceptor drum. Then, after delivering the charged metal powder particles to the outer surface of the photoreceptor drum, any excess powder can be cleaned from the outer surface of the photoreceptor drum using at least one electrically neutral adjustable powder skimmer blade, and then depositing the excess powder back into the at least one charged powder roller. Then, any remaining charge can be discharged from the photoreceptor drum outer surface using at least one discharge lamp and then re-charge the outer surface of the photoreceptor drum.

A method is also generally provided for printing a three-dimensional part, which involves positioning a metal workpart on a stationary platform; electrically charging the platform; preheating the metal workpart; rolling a rotating photoreceptor drum across the preheated metal workpart to transfer a plurality of charged metal powder particles from an outer surface of the rotating photoreceptor drum onto an outer surface of the workpart to form a metal print layer; and fusing the metal print layer to the workpart. In this method, the metal print layer can be fused to the workpart using electromagnetic radiation having wavelengths of about 100 MHz to about 300 GHz and the workpart can be preheated using thermal radiation. Additionally, this method can involve charging the outer surface of the rotating photoreceptor drum with an electrostatic charge; neutralizing the electrostatic charge on a portion of the outer surface of the rotating photoreceptor drum surface to form a layer definition corresponding to the neutralized portion; and developing the layer definition with charged metal powder particles such that the charged metal powder particles are positioned on the outer surface of the rotating photoreceptor drum corresponding to the neutralized portion. The electrostatic charge can be neutralized by exposing the rotating photoreceptor drum outer surface to a layer definition using at least one laser beam. The layer definition can be provided by a controller circuit.

In one embodiment of the method, the charged metal powder particles can be delivered from at least one charged powder roller onto the outer surface of the photoreceptor drum. After delivering the charged metal powder particles to the outer surface of the photoreceptor drum, excess powder can be cleaned from the outer surface of the photoreceptor drum using at least one electrically neutral adjustable powder skimmer blade and then depositing the excess powder back into the at least one charged powder roller.

In such an embodiment, the rotating photoreceptor drum is rolled across the preheated metal workpart in a first direction, then the rotating photoreceptor drum is rolled across the preheated metal workpart in a second direction to transfer a second plurality of charged metal powder particles from the outer surface of the rotating photoreceptor drum onto the outer surface of the workpart to form a second metal print layer, then the second metal print layer is fused onto the workpart.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for printing a three-dimensional part using a photoreceptor drum that sequentially prints in alternating clockwise and counterclockwise rotational directions, the method comprising:
    applying a first metal print layer, wherein applying the first metal print layer comprises:
        charging at least a first portion of an outer surface of a rotating photoreceptor drum with an electrostatic charge;
        neutralizing the electrostatic charge on the at least a first portion of the outer surface of the rotating photoreceptor drum to form a first layer definition corresponding to the neutralized at least a first portion;
        transferring a first plurality of charged metal powder particles from a first powder roller onto the outer surface of the rotating photoreceptor drum corresponding to the neutralized at least a first portion;
        transferring the first plurality of charged metal powder particles from the outer surface of the rotating photoreceptor drum onto a workpart to form a first metal print layer, the rotating photoreceptor drum rotating clockwise and the workpart having been preheated by a first microwave emitter and/or a first induction coil, the first microwave emitter and/or the first induction coil located upstream from the photoreceptor drum relative to the workpart when the photoreceptor drum rotates clockwise; and
        fusing the first metal print layer to the workpart using a second microwave emitter, the second microwave emitter located downstream from the photoreceptor drum relative to the workpart when the photoreceptor drum rotates clockwise;
    applying a second metal print layer, wherein applying the second metal print layer comprises:
        charging at least a second portion of the outer surface of the rotating photoreceptor drum with an electrostatic charge;
        neutralizing the electrostatic charge on the at least a second portion of the outer surface of the rotating photoreceptor drum to form a second layer definition corresponding to the neutralized at least a second portion;
        transferring a second plurality of charged metal powder particles from a second powder roller onto the outer surface of the rotating photoreceptor drum corresponding to the neutralized at least a second portion;
        transferring the second plurality of charged metal powder particles from the outer surface of the rotating photoreceptor drum onto the workpart to form a second metal print layer, the rotating photoreceptor drum rotating counter-clockwise and the workpart having been preheated by the second microwave emitter and/or a second induction coil, the second microwave emitter and/or the second induction coil located upstream from the photoreceptor drum relative to the workpart when the photoreceptor drum rotates counter-clockwise; and
        fusing the second metal print layer to the workpart using the first microwave emitter, the first microwave emitter located downstream from the photoreceptor drum relative to the workpart when the photoreceptor drum rotates counter-clockwise.

2. The method as in claim 1, wherein:
    applying the first metal print layer further comprises:
        prior to transferring the first plurality of charged metal powder particles from the outer surface of the rotating photoreceptor drum onto the workpart, preheating the workpart using the first induction coil; and/or
    applying the second metal print layer further comprises:
        prior to transferring the second plurality of charged metal powder particles from the outer surface of the rotating photoreceptor drum onto the workpart, preheating the workpart using the second induction coil.

3. The method as in claim 2, wherein the workpart is preheated through thermal radiation.

4. The method as in claim 1, wherein the electrostatic charge is neutralized by exposing the rotating photoreceptor drum outer surface to a layer definition using at least one laser beam, said layer definition provided by a controller circuit.

5. The method as in claim 1, wherein:
applying the first metal print layer further comprises:
  after delivering the first plurality of charged metal powder particles to the outer surface of the photoreceptor drum, cleaning any excess powder from the outer surface of the photoreceptor drum using a first at least one electrically neutral adjustable powder skimmer blade; and/or
applying the second metal print layer further comprises:
  after delivering the second plurality of charged metal powder particles to the outer surface of the photoreceptor drum, cleaning any excess powder from the outer surface of the photoreceptor drum using a second at least one electrically neutral adjustable powder skimmer blade.

6. The method as in claim 5, wherein:
applying the first metal print layer further comprises:
  depositing said excess powder with respect to cleaning after delivering the first plurality of charged metal powder particles back into the first powder roller; and/or
applying the second metal print layer further comprises:
  depositing said excess powder with respect to cleaning after delivering the second plurality of charged metal powder particles back into the second powder roller.

7. The method as in claim 5, wherein:
applying the first metal print layer further comprises:
  discharging any remaining charge from the photoreceptor drum outer surface using a first at least one discharge lamp, the discharging performed after delivering the first plurality of charged metal powder particles to the outer surface of the photoreceptor drum; and/or
applying the second metal print layer further comprises:
  discharging any remaining charge from the photoreceptor drum outer surface using a second at least one discharge lamp, the discharging performed after delivering the second plurality of charged metal powder particles to the outer surface of the photoreceptor drum.

8. A method for printing a three-dimensional part, the method comprising:
positioning a metal workpart on a stationary platform;
applying a first metal print layer, comprising:
  electrically charging the platform;
  preheating the metal workpart using a first induction coil;
  rolling a rotating photoreceptor drum clockwise across the preheated metal workpart to transfer a first plurality of charged metal powder particles from an outer surface of the rotating photoreceptor drum onto an outer surface of the workpart to form a first metal print layer; and
  fusing the first metal print layer to the workpart using a second microwave emitter;
applying a first metal print layer, comprising:
  preheating the metal workpart using a second induction coil;
  rolling the rotating photoreceptor drum counter-clockwise across the preheated metal workpart to transfer a second plurality of charged metal powder particles from an outer surface of the rotating photoreceptor drum onto an outer surface of the workpart to form a second metal print layer; and
  fusing the second metal print layer to the workpart using a first microwave emitter.

9. The method as in claim 8, wherein the metal print layer is fused to the workpart using electromagnetic radiation having frequencies of about 100 MHz to about 300 GHz.

10. The method as in claim 8, wherein the workpart is preheated using thermal radiation.

11. The method as in claim 8, wherein applying the first metal print layer and/or applying the second metal print layer further comprises:
  charging the outer surface of the rotating photoreceptor drum with an electrostatic charge;
  neutralizing the electrostatic charge on a portion of the outer surface of the rotating photoreceptor drum surface to form a layer definition corresponding to the neutralized portion; and
  developing the layer definition with charged metal powder particles such that the charged metal powder particles are positioned on the outer surface of the rotating photoreceptor drum corresponding to the neutralized portion.

12. The method as in claim 11, wherein the electrostatic charge is neutralized by exposing the rotating photoreceptor drum outer surface to a layer definition using at least one laser beam, said layer definition provided by a controller circuit.

13. The method as in claim 11, wherein the first plurality of charged metal powder particles are delivered from a first at least one charged powder roller onto the outer surface of the photoreceptor drum and/or wherein the second plurality of charged metal powder particles are delivered from a second at least one charged powder roller onto the outer surface of the photoreceptor drum.

14. The method as in claim 13, wherein:
applying the first metal print layer further comprises:
  after delivering the first plurality of charged metal powder particles to the outer surface of the photoreceptor drum, cleaning any excess powder from the outer surface of the photoreceptor drum using at least one electrically neutral adjustable powder skimmer blade; and
  depositing said excess powder back into the first at least one charged powder roller; and/or
applying the second metal print layer further comprises:
  after delivering the second plurality of charged metal powder particles to the outer surface of the photoreceptor drum, cleaning any excess powder from the outer surface of the photoreceptor drum using at least one electrically neutral adjustable powder skimmer blade; and
  depositing said excess powder back into the second at least one charged powder roller.

15. The method as in claim 1, wherein the first powder roller and the second powder roller rotate counter-clockwise when the photoreceptor drum rotates clockwise, and wherein the first powder roller and the second powder roller rotate clockwise when the photoreceptor drum rotates counter-clockwise.

16. The method as in claim 1, wherein the photoreceptor drum, the first powder roller, and the second powder roller are housed in a mobile housing, the mobile housing configured to traverse about the workpart.

17. The method as in claim 1, wherein the first microwave emitter and the first induction coil are housed in a first unit and the second microwave emitter and the second induction coil are housed in a second unit, the first unit and the second unit housed in the mobile housing.

* * * * *

UNITED STATES PATENT AND TRADEMARK OFFICE
CERTIFICATE OF CORRECTION

PATENT NO. : 10,150,255 B2
APPLICATION NO. : 14/956896
DATED : December 11, 2018
INVENTOR(S) : Joshua Tyler Mook and William T. Carter Page 1 of 1

It is certified that error appears in the above-identified patent and that said Letters Patent is hereby corrected as shown below:

In the Claims

At Claim 1, Lines 21-22, please replace "a first metal print layer" with "the first metal print layer";

At Claim 8, Lines 12-13, please replace "a first metal print layer" with "the first metal print layer";

At Claim 8, Line 16, please replace "applying a first metal print layer" with "applying a second metal print layer";

At Claim 8, Line 22, please replace "an outer surface of the rotating photoreceptor drum" with "the outer surface of the rotating photoreceptor drum";

At Claim 8, Line 23, please replace "an outer surface of the workpart" with "the outer surface of the workpart";

At Claim 8, Line 24, please replace "a second metal print layer" with "the second metal print layer"; and At Claim 17, Line 5, please replace "the mobile housing" with "a mobile housing".

Signed and Sealed this
Twenty-eighth Day of January, 2020

Andrei Iancu
*Director of the United States Patent and Trademark Office*